United States Patent [19]

McCrory

[11] 4,322,908
[45] Apr. 6, 1982

[54] ANIMATED WILDFOWL DECOY

[76] Inventor: Roy E. McCrory, 4044 Bishops Bridge Rd., Memphis, Tenn. 38118

[21] Appl. No.: 125,927

[22] Filed: Feb. 29, 1980

[51] Int. Cl.³ .............................................. A01M 31/06
[52] U.S. Cl. ............................................................ 43/3
[58] Field of Search ........................................... 43/3, 2

[56] References Cited

U.S. PATENT DOCUMENTS

| | | | |
|---|---|---|---|
| 2,028,849 | 1/1936 | Shay | 43/3 |
| 2,691,233 | 10/1954 | Richardson | 43/3 |
| 2,814,146 | 11/1957 | Propp | 43/3 |
| 2,835,064 | 5/1958 | Webb | 43/3 |
| 3,016,647 | 1/1962 | Peterson et al. | 43/3 |
| 3,074,195 | 1/1963 | Vanderpool | 43/3 |

Primary Examiner—Stephen G. Kunin
Assistant Examiner—J. T. Zatarga

[57] ABSTRACT

A improved animated wildfowl decoy with self-contained power and control systems featuring selectable solar energy power or alternative battery power, continuous solar energy re-charge of battery, unique new highly efficient capstan type torque conversion system, positive movement back and forth across the water, automatic direction reversal, sporatic movements, and unaffected by wind, currents or shallow water.

10 Claims, 3 Drawing Figures

ANIMATED WILDFOWL DECOY

BACKGROUND OF THE INVENTION

1. Field of the Invention

This invention relates generally to improvements in animated wildfowl decoys and, more particularly, but not by way of limitation, to an improved animated wildfowl decoy incorporating innovative concepts, some being characterized by solar energy operating power, solar energy continuous recharge of alternative battery power source, achievement of much higher efficiency ratio of torque utilization as compared to prior art, and inherent high resistance to adverse environmental conditions.

2. Description of the Prior Art

In the past there have been several types of animated wildfowl decoys designed for movement in various ways to imitate live wildfowl. One such self-propelled duck decoy, which was proposed in the past, is described in the U.S. Pat. No. 3,074,195, issued to F. W. Vanderpool. The duck of the Vanderpool patent, in one form utilized manual remote control, battery powered motor driven propeller, and reversible direction of propulsion.

One other animated wildfowl decoy is described in the U.S. Pat. No. 2,814,146, issued to M. G. Propp. The decoy of the Propp patent also utilized a battery powered motor driven propeller for propulsion with a reversing switch.

Another animated wildfowl decoy is described in the U.S. Pat. No. 2,835,064, issued to J. E. Webb. The decoy of the Webb patent utilized a battery powered motor driven propeller for propulsion with a rudder for directional control.

SUMMARY OF THE INVENTION

An object of the invention is to provide an improved decoy with self-contained power and automatic control systems.

Another object of the invention is to provide an improved decoy utilizing a direct-current electric motor drive system with unique and improved motor torque conversion.

Also an object of the invention is to provide an improved decoy utilizing, upon setting of selector switch, solar energy as a power source.

A further object of the invention is to provide an improved decoy utilizing, upon setting of selector switch, an improved battery power source.

Additionally, an object of the invention is to provide an improved decoy utilizing automatic direction change by use of uniquely designed automatic direction switch.

Still another object of the invention is to provide an improved decoy which permits operator to choose his desired range of operation.

An additional object of the invention is to provide an improved decoy equipped with automatic timer for intermittent start and stop.

Further still an object of the invention is to provide an improved decoy prone to immunity from operational hazards such as wind, currents, and water depth.

One other object of the invention is to provide an improved decoy, operated by self-contained power and automatic control systems, capable of towing one or more slave decoys, resulting in group performance as opposed to singular performance.

Other objects reside in the ease of adaptability to land operation of the animated wildfowl decoy.

Other objects reside in the ease of adaptability of the unique systems of solar power, directional control, and torque conversion to other purposes.

DESCRIPTION OF THE PREFERRED EMBODIMENT

Figure 1:
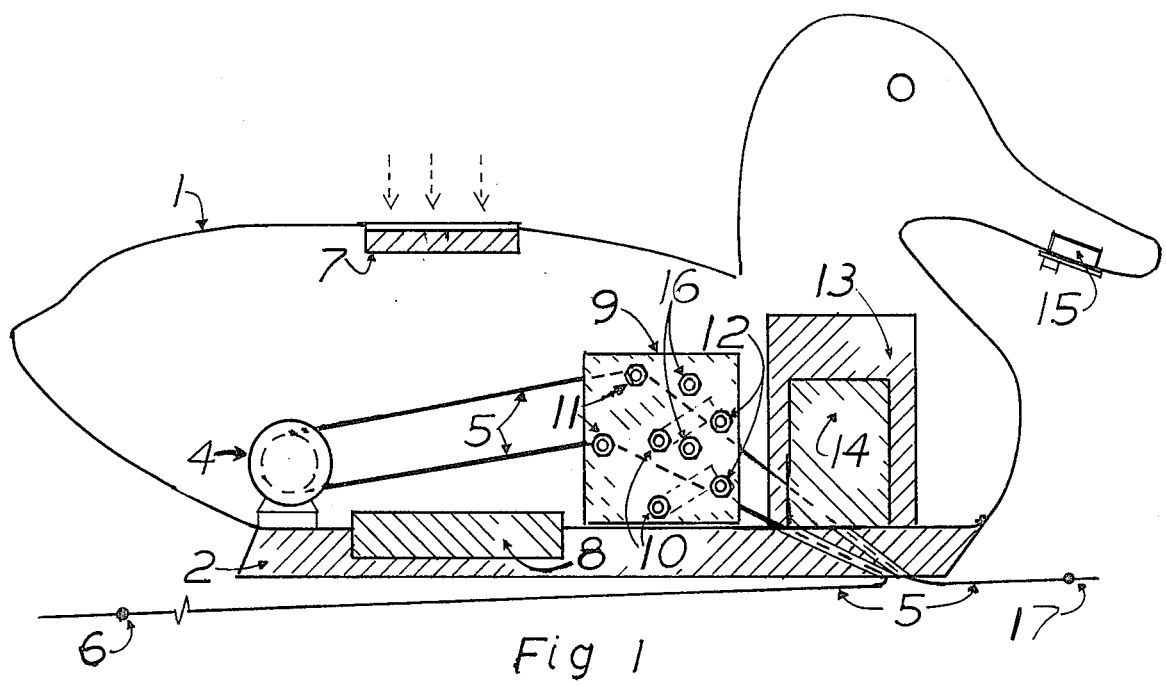
FIG. 1 is a vertical longitudinal sectional elevation through a animated wildfowl decoy embodying features of the present invention.
Figure 2:
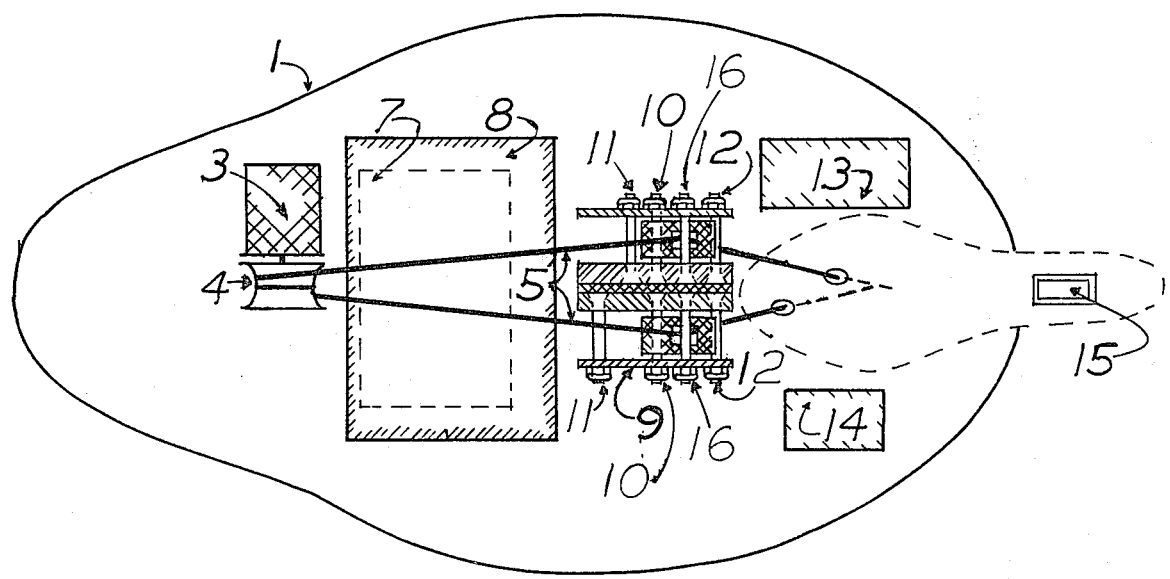
FIG. 2 is a horizontal longitudinal sectional plan view through a animated wildfowl decoy embodying features of the present invention.
Figure 3:
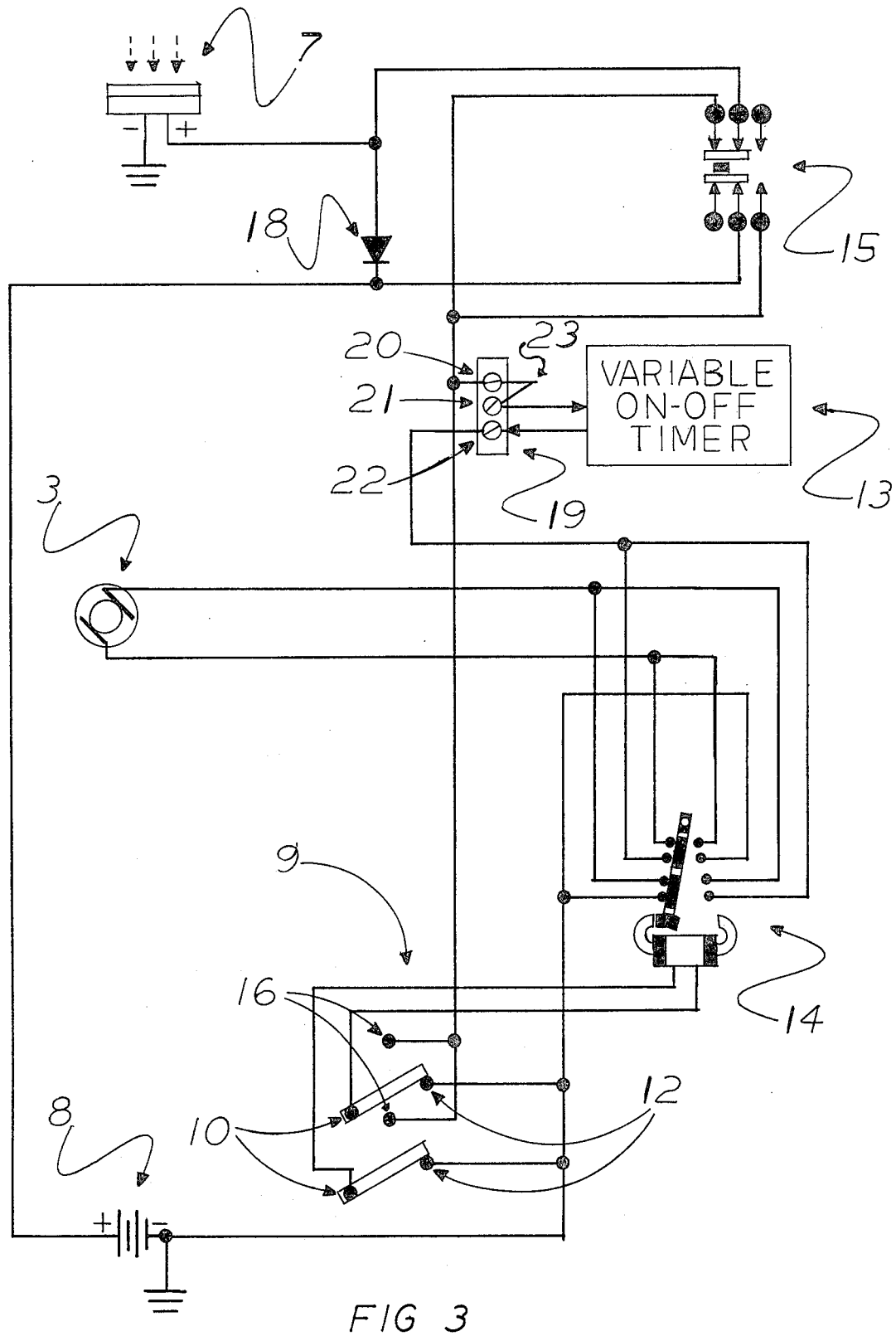
FIG. 3 is a partial schematic and partial diagrammatical view of the electronics of an animated wildfowl decoy embodying features of the present invention.

Shown in FIGS. 1, 2, and 3 is an animated wildfowl decoy which generally includes: a detachable top cover 1 formed of lightweight plastic in the image of a duck or other wildfowl; a flotation platform 2 composed of a solid mass of lightweight low density material to provide flotation at shallow draft; a power source assembly comprised of photovoltaic cell 7 to provide continuous solar electrical energy charging current for battery 8 and, when employed by selector switch 15, solar electrical energy for powering motor 3; a power source assembly comprised of battery 8 to provide, when employed by selector switch 15, operating current for motor 3; a double-pole double-throw center-off slide switch 15, to provide circuitry for energizing, or de-energizing, motor 3; a direct-current electric motor 3 to provide direct drive to torque converter capstan 4; a torque converter capstan 4 which, when rotating, pulls itself along tether string 5, causing the animated wildfowl decoy to traverse tether string 5; a tether string 5, to provide a stationary track upon the water, along which the animated wildfowl decoy moves to and fro, and to provide a place for affixing terminus control knots 6 and 17; terminus control knots 6 and 17 affixed in tether string 5 on either side of flotation platform 2, of sufficient size to prevent their passing through slots in moveable contact 10 of direction switch 9 so that said knots cause employment of direction switch 9 and activate its moveable contact 10; a direction switch 9, embodying two moveable contacts 10 connected to leads of coil of relay 14, two normally closed stationary contacts 12 having a negative voltage potential, two normally open stationary contacts 16 having a positive voltage potential, and two roller bearings 11, to operate relay 14; a bi-stable, polarity sensitive, pulse operated relay 14 having a double-pole double-throw contact form to provide reversibility of polarity of current to motor 3; a solid state integrated circuit timer 13 which, when employed, intermittently turns power on and off to cause sporatic action; a diode 18 to provide protection from reverse currents and other undesired spurious electrical transients for photovoltaic cell 7; and a terminal strip 19 with terminals 20, 21, and 22, and jumper wire 23, as a sub-part thereof for connecting and/or disconnecting timer 13 into electronic circuit FIG. 3.

OPERATION OF THE PREFERRED EMBODIMENT

The animated wildfowl decoy is constructed to operate decisively and vigorously over presettable distances in natural wildfowl habitat conditions as selected by its operator. This is made possible by the effectiveness of its solar energy power source photovoltaic cell 7, continuously re-charged battery 8, highly effective torque converter capstan 4, traverse of tether string 5, unique automatic direction switch 9, automatic on-off timer 13, and shallow draft flotation platform 2. The results are extended operating capability of the animated wildfowl decoy in sporatic and erratic movements effectively emulating normal movements of live wildfowl in their natural habitat. The animated wildfowl decoy thus provides a compact, efficient, reliable, and positive apparatus useful in connection with efforts to convince live wildfowl that the animated wildfowl decoy is itself a live wildfowl enjoying the luxury of a safe haven, thus conveying to the live wildfowl a feeling of security and an attractive invitation to approach and join its species.

To initiate operation of the animated wildfowl decoy operator selects a natural water habitat with a surface area of a few square feet or more and a depth of an inch or more, secures tether string 5 at each end of the range he selects, affixes terminus control knots 6 and 17 in tether string 5 at each side of the animated wildfowl decoy to establish operating travel terminus and moves slide switch 15 from its center-off position to either of its two on positions.

Slide switch 15 is a double-pole double-throw center-off slide switch employed in the electronic circuit FIG. 3 to provide for selection of (a) on-power source photovoltaic cell 7 which employs circuitry to cause current output of photovoltaic cell 7 to pass through timer 13 and relay 14 to operate motor 3, (b) on-power source battery 8 which employs circuitry to cause current output of battery 8 to pass through timer 13 and relay 14 to operate motor 3, or (c) off-center-off position which de-energizes motor 3.

Upon employment of slide switch 15 in one of its on positions circuitry is employed to transmit operating current to motor 3 causing it to rotate in a direction dictated by the polarity of its energizing current, which polarity is determined by the happenstance position of the contact form of relay 14. Relay 14 is a bi-stable polarity-sensitive pulse-operated relay with a double-pole double-throw contact form which is used to transmit and, when thrown, reverse polarity of operating current to motor 3. As motor 3 rotates it turns torque converter capstan 4 in the same direction of rotation, which exerts a pull in that direction upon tether string 5. Thus, tether string 5, with its ends secured, provides a stationary track with terminus points control knots 6 and 17 upon which the torque converter capstan 4 pulls the animated wildfowl decoy across the surface of the water to either control knot 6 or control knot 17, depending upon direction of rotation of torque converter capstan 4. As a moveable contact 10 intersects a terminus control knot 6 or 17 that moveable contact 10 is thereby lifted from its normally closed position on normally closed stationary contact 12, of negative voltage potential, until it contacts a normally open stationary contact 16 of positive voltage potential, whereupon the employed circuitry causes a polarized flow of current to the coil of relay 14 such as will cause the relay 14 contact form to throw to the opposite position, thereby reversing polarity of the current driving motor 3, which reverses direction of rotation of motor 3 and torque converter capstan 4, and reverses direction of travel of the animated wildfowl decoy, thereby starting the process over again in the opposite direction, allowing moveable contact 10 to gravitate back to its normally closed position on normally closed stationary contact 12.

Timer 13 is a solid state integrated circuit timer of present day standard stock technology and is interposed in the electronic circuit FIG. 3 of the animated wildfowl decoy such that it becomes employed when jumper wire 23 connects terminals 20 and 21 of terminal strip 19 and becomes unemployed when jumper wire 23 connects terminals 20 and 22 of terminal strip 19.

No attempt has been made herein to provide complete structural details to illustrate means by which the body and the mechanisms therein may be assembled or taken apart, either in whole or in part, for replacement or adjustment of parts since such expedients are common and well known and have no bearing on the invention as herein presented.

It will be appreciated that in some instances certain of the sub-assemblies of mechanisms hereinbefore described could be omitted and the invention could operate with only a part of the previously described structure and functions incorporated therein.

From the foregoing it will be apparent to those skilled in the art that a unique and improved animated wildfowl decoy is provided by the present invention and that the objects of the invention are fulfilled. It will be further apparent that while a preferred embodiment of the invention has been shown and described, changes can be made without departing from the principals and spirit of the invention, the scope of which is defined in the appended claim. For example, should it be desired to operate on land as opposed to water then simply by equipping it with wheels, skids, or the like, the animated wildfowl decoy readily becomes land operable. Accordingly, the foregoing embodiment is to be considered illustrative, rather than restrictive of the invention, and those modifications which come within the meaning and range of equivalency of the claim is to be included therein.

In the past there have been many configurations of mechanically animated wildfowl decoys contrived. However, the extent of concurrence between those and the present invention is found to be only the hollow body and electric motor concepts, therefore:

I claim:

1. An animated wildfowl decoy comprising a floatable hollow body having a bottom with an opening therein; the hollow body being formed in the image of a wildfowl and housing therein a fixed capstan means; a length of tether line means with an intermediate portion thereof looped through the bottom opening and entrained about the capstan means, the end portions of the tether line means being adapted to be tautly secured; and an electric circuit including a battery and a motor attached to the capstan means for rotating the capstan means to pull the hollow body along the length of said tether line means.

2. The animated wildfowl decoy of claim 1 wherein the battery is rechargeable.

3. The animated wildfowl decoy of claim 1 further including means to convert solar energy into electric energy for powering the motor and/or re-charging the battery.

4. The animated wildfowl decoy of claim 3 wherein the means to convert includes a solar energy photovoltaic cell.

5. The animated wildfowl decoy of claim 1 wherein the electric circuit includes timer means for providing intermittent starts and stops to increase life-like movements of the animated wildfowl decoy.

6. The animated wildfowl decoy of claim 1 wherein the bottom is a flotation plate-form made from a solid mass of low density flotation material.

7. The animated wildfowl decoy of claim 1 wherein the electric circuit includes a manually operated on/off switch disposed exteriorly on the hollow body.

8. The animated wildfowl decoy of claim 1 wherein the motor is reversible and the electric circuit includes electronic control means for reversing the motor and the direction of movement of the animated wildfowl decoy.

9. The animated wildfowl decoy of claim 8, wherein the tether line means have stop means affixed along the end portions and the electronic control means is responsive to the stop means entering the interior of the hollow body to effect reversal of the motor.

10. The animated wildfowl decoy of claim 9 wherein a pair of levers are disposed interiorly of the hollow body adjacent the bottom opening, a pair of direction switches in the electric circuit operatively associated with said levers, the paths of travel of the two flights of the loop of the tether line means being such that when either stop means enters the interior of the hollow body it will trip a respective lever to activate a respective direction switch to provide a control signal to the electronic control means for reversing direction of rotation of the motor driven capstan means and thereby the direction of travel of the animated wildfowl decoy.

* * * * *